(12) United States Patent
Hofstetter et al.

(10) Patent No.: US 10,050,507 B2
(45) Date of Patent: Aug. 14, 2018

(54) LINEAR MOTOR HAVING A PLURALITY OF SENSOR UNITS AND A MODULAR STATOR SETUP

(71) Applicant: HAMILTON BONADUZ AG, Bonaduz (CH)

(72) Inventors: Meinrad Franz Hofstetter, Felsberg (CH); Eduard Nawrocki, Bonaduz (CH); Hanspeter Romer, Hinwil (CH); Vinzenz Kirste, Bonaduz (CH)

(73) Assignee: Hamilton Bonaduz AG, Bonaduz (CH)

( * ) Notice: Subject to any disclaimer, the term of this patent is extended or adjusted under 35 U.S.C. 154(b) by 875 days.

(21) Appl. No.: 14/355,922

(22) PCT Filed: Nov. 2, 2012

(86) PCT No.: PCT/EP2012/071690
§ 371 (c)(1),
(2) Date: May 2, 2014

(87) PCT Pub. No.: WO2013/064614
PCT Pub. Date: May 10, 2013

(65) Prior Publication Data
US 2015/0028699 A1 Jan. 29, 2015

(30) Foreign Application Priority Data
Nov. 2, 2011 (DE) .................. 10 2011 085 636

(51) Int. Cl.
*H02K 41/02* (2006.01)
*H02K 41/03* (2006.01)
(Continued)

(52) U.S. Cl.
CPC ............... *H02K 41/02* (2013.01); *H02K 1/17* (2013.01); *H02K 11/21* (2016.01); *H02K 41/031* (2013.01); *H02K 2213/12* (2013.01)

(58) Field of Classification Search
CPC ...... H02K 41/031; H02K 11/21; H02K 41/02; H02K 1/17
(Continued)

(56) References Cited

U.S. PATENT DOCUMENTS 4,158,509 A * 6/1979 Rieder .................. G01D 5/363
250/237 G
5,530,303 A 6/1996 Takei
(Continued)

FOREIGN PATENT DOCUMENTS

DE 1773460 9/1971
DE 297 23 597 U1 3/1998
(Continued)

OTHER PUBLICATIONS

International Search Report cited in PCT/EP2012/071690, dated Apr. 1, 2014, 4 pgs.
(Continued)

*Primary Examiner* — Naishadh Desai
(74) *Attorney, Agent, or Firm* — Rothwell, Figg, Ernst & Manbeck, P.C

(57) ABSTRACT

A linear motor, comprises at least one stator device (14) with a plurality of permanent magnets (18, 18-1, 18-2) of different polarity and with at least one carrier rail (24), and at least one rotor device (12) with at least three electrical coils (44) and with at least one supporting means (26), which can be or which is supported on the carrier rail (24) of the stator device (14), wherein the rotor device (12) and the stator device (14) are moveable to and fro with respect to each other along a movement direction (FR) defined by the carrier rail (24) by interaction of magnetic fields of the permanent magnets (18, 18-1, 18-2) with the magnetic fields of the coils (44), through which current flows if required, wherein the stator device (14) is formed from at least one stator module
(Continued)

(16-1, 16-2), wherein the stator module (16-1, 16-2) is configured such that a stator device (16) with two or more consecutively arranged stator modules (16-1, 16-2) can be formed, and wherein at the stator module (16-1, 16-2) at least one measurement track (40, 40-1, 40-2, 40-3) scannable by a sensor unit (52-1, 52-2) of the rotor device (12) is provided, which runs substantially parallel to the movement direction (FR). On the rotor device (12) at least two sensor units (52-1, 52-2) scanning the measurement track (40, 40-1, 40-2, 40-3) are provided, which are arranged along the movement direction (FR) of the rotor device (12) in a distance (SA) such that if the rotor device (12) is arranged on a connection point (64, L) between two stator modules (16-1, 16-2) the respective measurement tracks (40, 40-1, 40-2, 40-3) of the adjacent stator modules (16-1, 16-2) are scannable by one of the two sensor units (52-1, 52-2), respectively.

24 Claims, 4 Drawing Sheets

(51) Int. Cl.
*H02K 1/17* (2006.01)
*H02K 11/21* (2016.01)

(58) Field of Classification Search
USPC ......... 310/12.01, 12.04, 12.05, 12.07, 12.09, 310/12.19, 12.25, 13
See application file for complete search history.

(56) References Cited

U.S. PATENT DOCUMENTS

| | | | |
|---|---|---|---|
| 5,963,330 A | 10/1999 | Braasch | |
| 5,994,798 A | 11/1999 | Chitayat | |
| 6,008,552 A * | 12/1999 | Yagoto | H02K 41/031 310/12.14 |
| 7,825,548 B2 * | 11/2010 | Maemura | H02K 41/03 310/12.02 |
| 8,878,399 B2 * | 11/2014 | Hanamura | H02K 16/00 294/188 |
| 2003/0230941 A1 * | 12/2003 | Jacobs | B60L 15/38 310/12.19 |
| 2004/0066497 A1 | 4/2004 | Koide | |
| 2007/0051269 A1 | 3/2007 | Reichel et al. | |
| 2008/0265826 A1 | 10/2008 | Sasaki et al. | |
| 2009/0120967 A1 * | 5/2009 | Bensley | F04B 9/02 222/333 |
| 2011/0109252 A1 * | 5/2011 | Takagi | H02K 11/215 318/135 |
| 2013/0099604 A1 * | 4/2013 | Yu | H02K 1/148 310/43 |
| 2014/0139057 A1 * | 5/2014 | Ho | H02K 1/148 310/54 |

FOREIGN PATENT DOCUMENTS

| | | | |
|---|---|---|---|
| DE | 69809774 T2 | | 12/2003 |
| EP | 2288008 A2 | | 2/2011 |
| JP | H11 150973 A | | 6/1999 |
| JP | H11150973 A | | 6/1999 |
| JP | 2005 039941 A | | 2/2005 |
| JP | 2010 142033 A | | 6/2010 |
| JP | 2010142033 A | * | 6/2010 |
| KR | 2011 0057033 A | | 5/2011 |
| KR | 2011 0057034 A | | 5/2011 |

OTHER PUBLICATIONS

First Office Action cited in Chinese Application No. 2012800538992 dated Dec. 10, 2015 (7 pages).
Search Report cited in Chinese Application No. 201280038992 dated Dec. 2, 2015 (2 pages).

* cited by examiner

LINEAR MOTOR HAVING A PLURALITY OF SENSOR UNITS AND A MODULAR STATOR SETUP

CROSS REFERENCE TO RELATED APPLICATION

This application is a 35 U.S.C. 371 National Phase Entry Application from PCT/EP2012/071690, filed Nov. 2, 2012, which claims the benefit of German Patent Application No. 10 2011 085636.6 filed on Nov. 2, 2011, the disclosure of which is incorporated herein in its entirety by reference.

The present invention relates to a linear motor, comprising at least a stator device with a plurality of permanent magnets of different polarity and with at least one carrier rail and comprising at least one rotor device with at least three electric coils and with at least one supporting means that can be or is supported on the carrier rail of the stator device, wherein the rotor device and the stator device are moveable to and fro with respect to each other along a movement direction defined by the carrier rail due to interaction of magnetic fields of the permanent magnets with the magnetic fields of the coils, through which current flows if required, wherein the stator device is formed from at least one stator module, wherein the stator module is configured such that a stator device with two or more stator modules arranged one after another can be formed, and wherein on the stator module at least one measurement track, which can be scanned by a sensor unit of the rotor device, is provided, which substantially runs parallel to the movement direction.

Such a linear motor is for example known from EP 2 288 008 A2.

When using scannable measurement tracks in combination with stator modules adjacent to each other, in practice the problem occurs that during arrangement of a plurality of stator modules spacings between the stator modules occur caused by construction and/or production. These spacings are not necessary equal between two adjacent stator modules and may vary in a certain range. According to EP 2 288 008 A2 it is intended that the measurement track is formed continuously and hence bridges possible spacings. This leads to a long single-piece measurement track, whose manufacturing and installation is elaborate and expensive.

Because of the spacings there can also occur problems and/or errors during the exact positioning. If one considers for example a linear motor with a movement length of one meter, which is built from four stator modules of the same length, there are three spacings in total. For spacings in the order of 1 millimeter every 0.25 m a systematic positioning error of 1 mm occurs. The track on which the linear motor can move therefore amounts effectively to 1 meter plus 3 millimeter.

If this error is not considered during positioning, undesired effects may occur, depending on the application.

In particular, for devices (pipetting apparatus), which the applicant operates with linear motors, an exact positioning is necessary to guarantee that pipette tips moved by the linear motor can be positioned exactly on corresponding sample containers (which are fixed during pipetting). A deviation of for example 2-3 millimeters may have the effect that a pipette tip cannot be inserted into a sample container centrally, but very close to its edge, which can be disadvantageous with regard to a uniform extraction of sampling liquids (capillary forces between the pipette tip and the inner wall of the sampling container; stronger adhesion of the sampling liquid to the sampling container edge, etc.). In the extreme case, positioning errors may also have the effect that the pipette tip(s) are hindered from the entry into the sampling container by the edge of the sampling container, which may possibly lead to damages.

Therefore, the object of the invention is to develop a modular setup linear motor such that the above disadvantages do not occur.

Accordingly in the present invention it is proposed that at the rotor device at least two sensor units scanning the measurement track are provided, which are arranged in the movement direction of the rotor device in a distance from each other such that in case of an arrangement of the rotor device at one of the connection points between the two stator modules the respective measurement tracks on the adjacent stator modules are each scannable by one of the two sensor units.

The simultaneous scanning of measurement tracks on adjacent stator modules makes it possible to determine how large the distance between the adjacent stator modules or measurement tracks is. The distance or spacing is in particular indicated by a displacement of the measurement track, which can be scanned and evaluated by the sensor units with respect to expectation values, which for example have to be measured on a continuous measurement track. Accordingly, the exact position of the rotor device, for example related to a zero point of the movement track on one end of the stator device, may be determined via a correction function which considers the extent of the distances/spacings between adjacent stator modules. If one exemplarily assumes a distance between two adjacent stator modules of about 1 millimeter, the position of the rotor device with respect to the zero point of the stator unit can be corrected by the sum of the distances/spacings in dependence on which stator module the position measurement has been performed, i.e. in dependence of how many spacings have been traversed already (completely). For example, the position measured according to the measurement track on the second stator module (with respect to the zero point on the stator device) would have to be corrected by one millimeter: In order to reach a position of 0.4 m with respect to the zero point, the rotor device would have to be positioned at 0.399 m at a stator module length of 0.25 m if the distance of 1 millimeter between the two first stator modules is taken into account.

Preferably, the stator module is formed plate-like with two longitudinal sides extending between the two module endings, wherein further preferably the stator module comprises a recess formed in a traverse direction between the longitudinal sides, in which the permanent magnets are arranged. The at least one measurement track may then be arranged in a traverse direction between one of the longitudinal sides and the permanent magnets.

The permanent magnets may be formed in form of a flat bar such that each of their longer sides point into the direction of the longitudinal sides of the stator module, wherein preferably the longitudinal sides of the permanent magnets and the longitudinal sides of the stator module are arranged inclined with respect to each other, preferable by an angle, which deviates approximately 1 to 10 degree from a right angle.

On the longitudinal sides a respective carrier rail may be provided, preferably in form of a convex profile, which in particular protrudes on a side of the stator module. Such a profile may be in interaction with a complementary profile on the rotor device or may be brought to such an interaction such that the rotor device may slide along this profile on the stator device.

Preferably, on the rotor device a magnetic return metal sheet is provided, at which return elements wrapped by a corresponding coil are formed, wherein preferably the return elements are facing the permanent magnets, in particular in a direction downwards from the rotor device with respect to an arrangement of the stator device under normal operation conditions, and preferably protrude downwards over the coils.

Further, the at least one stator module may comprise a first and a second module ending, wherein the module endings are configured such that between a first module ending of a first stator module and a second ending of a second stator module a form-closed connection can be or is established. Such a configuration of form-closed connections allows a precise consecutive arrangement of stator modules, wherein the spacing or distance between adjacent stator modules can be kept small. Further, such form-closed connections allows for a simple setup of a stator device of a linear motor formed by stator modules. Preferably, the form-closed connection is formed detachable such that a stator device of stator modules may also be divided into single stator modules again. This allows for a high flexibility during setup or modification of stator devices, during maintenance (replacement of single stator modules if necessary), as well as for re-using of stator modules for a linear motor of another superordinate device.

It is preferred that the first module ending of the stator module comprises a connection portion protruding in longitudinal direction and that the second module ending comprises a connection recess formed in longitudinal direction such that in a connected state of two adjacent stator modules the form-closed connection between the connection portion of the first stator module and the connection recess of the second stator module can be or is established. The connection recess is preferably arranged such that it is located below the permanent magnets such that after connecting of two adjacent stator modules an arrangement of permanent magnets results, which is continuous in the movement direction.

On the stator module a plurality of drill holes may be formed, which are provided to fix the stator module on a frame of a superordinate device via bolts or screws.

Further, at the at least one stator module several measurement tracks may be provided, preferably one measurement track for scanning an absolute position on the concerned stator module, preferably one measurement track for scanning of predetermined increments along the stator module and preferably one measurement track identifying the stator module within the stator device. Depending on the number and design of the measurement tracks the position of the rotor device relative to the stator device or relative to a specific stator module of the stator device may be determined from the various measurement tracks. For several measurement tracks the different determined position values for each measurement track may be compared to each other and in this manner a positioning value as exact as possibly is obtained or calculated. Further, the linear motor may also be operated, if, for example, one of the sensor units for one of the measurement tracks fails, as measurement values of the other sensor units of the further measurement track(s) can still be evaluated. Further, it is conceivable that measurement tracks on adjacent stator modules are formed identically. Then, in such a case an exact positioning is possible if it can be determined on which stator module a measurement is performed.

The sensor units provided on the rotor device are preferably formed such that they can scan several measurement tracks, wherein they comprise preferably several sensors, which are assigned to a respective measurement track. There may be provided one sensor per measurement track. Further, also differently large sections of a respective measurement track may be scanned, if necessary also in dependence of how the measurement track itself is formed.

The rotor device may comprise a circuit for controlling the current flows in the coils, wherein the circuit is preferably configured to generate a corresponding current flow in the coils in dependence of the actual position of the rotor device and a desired position to be reached, in order to generate the desired movement of the rotor device relative to the stator device.

In this context the circuit may be configured to determine the position and/or the speed and/or the acceleration of the rotor device with respect to the stator device, wherein the circuit preferably comprises an evaluation device, which is configured to generate position dependent signals based on scanning signals, which are captured from the sensor units.

Preferably, the rotor device is connected with a current source and further preferably the rotor device may be connected with a control unit of a superordinate device.

Further, the stator device with the at least one stator module may comprise connected or connectable stator termination elements, which delimitate the track, on which the rotor device can move. Preferably, the stator termination elements may also be connected form-closed with either the first or the second module ending of a stator module. The stator termination elements may form a kind of buffer stop for the rotor device. On the stator termination elements permanent magnets may be present only partly or not at all such that the rotor device will come to rest even with energized coils because of the acting friction forces and because of the missing driving force based on electromagnetic interaction. Also a special measurement track may be arranged, which leads after its scanning to an immediate stop of the rotor device (switch-off of the current flow in the coils).

The linear motor presented herein may be used in various superordinate devices (machines), for which linear delivery movements are necessary.

In particular, preferred and subject-matter of the invention is in this context a pipetting apparatus, comprising at least one linear motor with one of the aforementioned features, wherein the at least one linear motor is provided for moving a pipetting device of the pipetting apparatus.

Further, the invention relates also to a stator device of a linear motor with a plurality of permanent magnets of different polarity and with at least one carrier rail for a rotor device of the linear motor, wherein the rotor device and the stator device are moveable to and fro relative to each other along a movement direction defined by the carrier rail, wherein in the present invention the stator device is formed from at least one stator module with a first and a second module ending, wherein the module endings are formed such that between a first module ending of a first stator module and a second module ending of a second stator module a form-closed connection can be established, preferably such that the distance between the two connected stator modules is smaller or equal to 1 millimeter.

To this end, the stator device may at least comprise one of the features described above in context of the linear motor, which is directed to the stator device and/or to the at least one stator module.

Finally, the invention relates to a rotor device of a linear motor with at least three electric coils and with at least one supporting means supportable on a carrier rail of a stator device of the linear motor, wherein the rotor device and the stator device are moveable to and fro with respect to each other along a movement direction due to interaction of magnetic fields of permanent magnets of the stator device with the magnetic field of the coils, through which current flows if required, wherein according to the invention the rotor device is configured such that it is linkable with one of the stator devices described above.

Such a rotor device may at least comprise a further feature, which refers to the rotor device and which has been described above in context of the linear motor.

In the following the invention will be exemplary and non-restrictingly described with reference to the accompanying figures according to a preferred embodiment.

Figure 1:
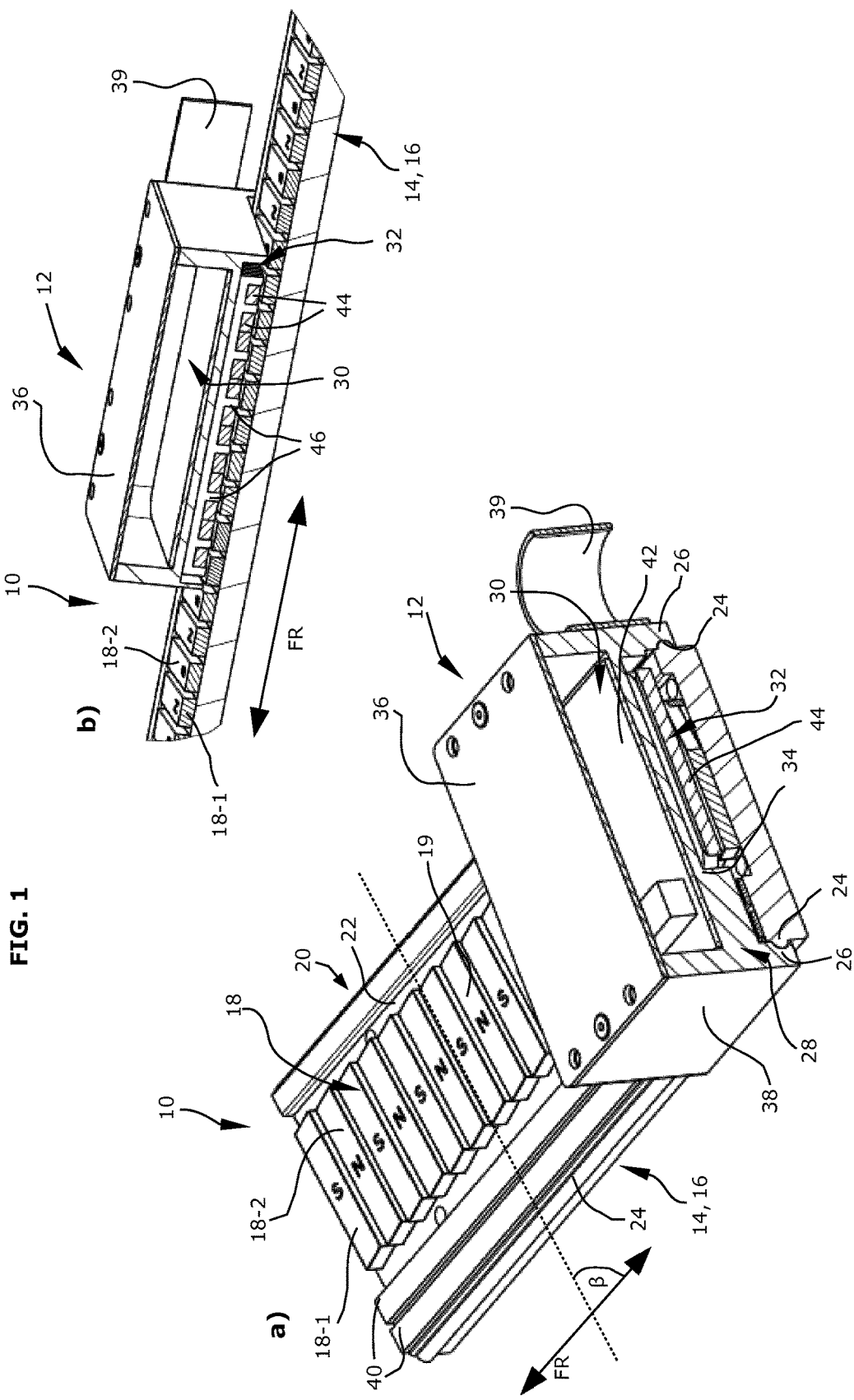
FIG. 1 illustrates in sub-figures a) and b) simplified partly cross-sectional perspective illustrations of an embodiment of a linear motor.

FIG. 1 shows in sub-figures a) and b) in simplified and schematic perspective illustration partial cross-sectional views of an embodiment of a linear motor 10. A rotor device 12 is moveable relative to a stator device 14 in a longitudinal direction. This longitudinal direction corresponds in the present application to a movement direction FR. In sub-figure a) a cross section (section orthogonal to the movement direction FR) through the rotor device 12 and the stator device 14 or an associated stator module 16 is illustrated. In sub-figure b) a longitudinal direction (parallel to the movement direction FR) through the rotor device 12 and the stator device 14 or an associated stator module 16 is illustrated.

The stator device 14 comprises several permanent magnets 18 with alternating polarity, wherein permanent magnets with a north pole directed towards the rotor device 12 are denoted with reference signs 18-1 and permanent magnets with a south pole directed toward the rotor device 12 are denoted with reference signs 18-2. The permanent magnets 18 are inserted between lateral edges 20 of the stator device 14 in a recess 22 and are preferably formed in form of flat bars. The longitudinal sides 19 of the permanent magnets 18 are arranged inclined with respect to the movement direction FR or to the lateral edges 20 such that these virtual lines include an angle $\beta$, which is unequal to 90°, wherein the deviation from a right angle preferably amount to approximately 1 to 10°.

Along the lateral edges 20 sliding sections 24 are formed, which provide the functions of carrier rails for the rotor device 12. The sliding sections or carrier rails 24 are formed in the present embodiment as semicircular (convex) profiles, curved outwardly. These profiles 24 interact with complementary (concave) formed sliding profiles 26 (supporting means) of the rotor device 12. The illustrated embodiment of the sliding sections 24 of the stator device 12 and the sliding profiles 26 of the rotor device 12, respectively, is preferable, but constitutes only an example of a design for allowing the relative movement, in particular, the relative sliding, of the rotor device 12 and the stator device 14 with respect to each other. Conceivable are for example also angled profiles or moveable support means, for example rolling element bearings with rolls or balls, in particular in form of rolling element bearings, in which the rolls or balls circulate, or the like.

The rotor device 12 comprises a housing-like main body 28 with an upper housing recess 30 and a lower housing recess 32, which are separated by a housing bottom 34. The upper housing recess 30 may be covered by a housing cover 36 and be closed. The lower housing recess 32 is bounded on its sides by wall portions 38, in which the sliding profile 26 are formed. In order to be able to supply the rotor device 21 with electric energy and in order to be able to establish a wired connection to a control unit of a superordinate device if necessary, a cable band 39 is connected to the rotor device 12.

Along the permanent magnets 18 along the movement direction FR for example two measurement tracks 40 are provided on the stator device 14. These measurement tracks serve for determining the position of the rotor device 12 relative to the stator device 14 as well as for determining the acceleration and speed of the rotor device 12 relative to the stator device 14. A pattern on the measurement tracks scannable via sensors may be formed by varying coloring (e.g. alternation of black and white stripe-like regions) and/or by forming a profile with protrusions and recesses.

Figure 3:
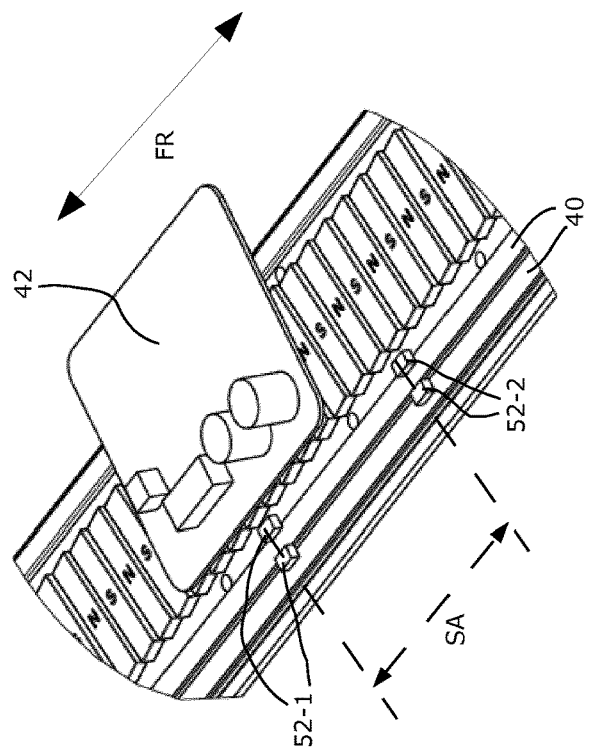
FIG. 3 shows in a perspective partial view the stator device as well as parts of the rotor device.
Figure 2:
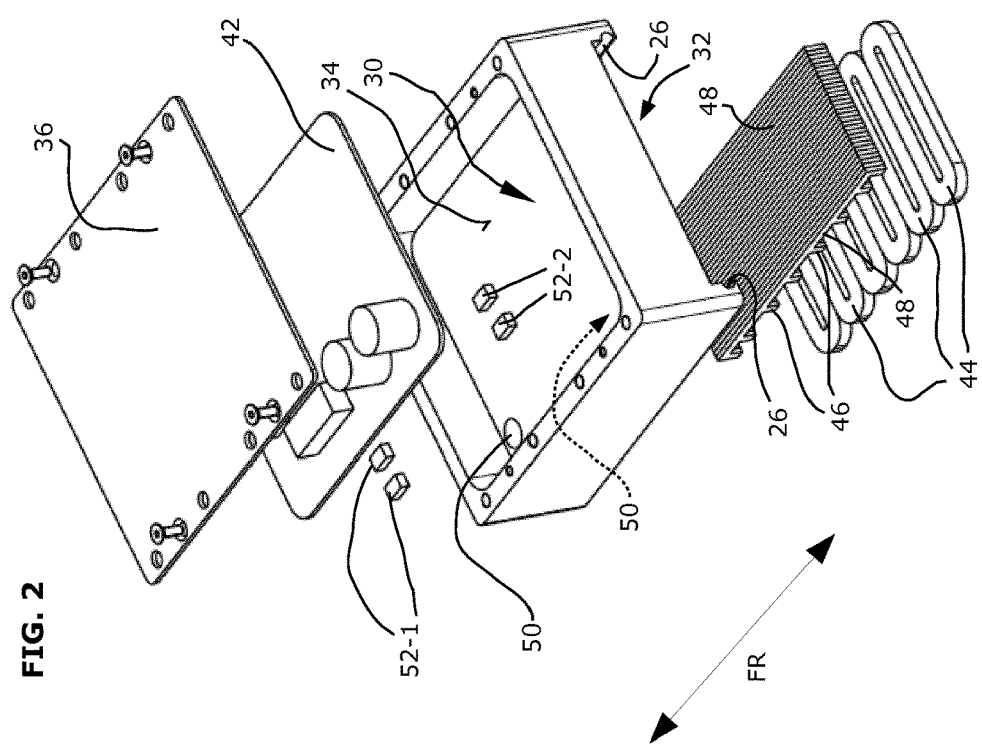
FIG. 2 shows in a simplified exploded view a rotor device of the linear motor.

The setup of the rotor device 12 will be described below with reference to the schematic exploded view of FIG. 2 as well as to the partial view of FIG. 3 including the stator device 14. Corresponding elements of the rotor device 12 are indicated with the corresponding reference signs also in FIG. 1 without being described once more with reference to FIG. 1.

In the upper housing recess 30 a circuit board 42 is integrated, which comprises preferably a circuit for controlling the current flow through the coils 44 of the rotor device 12. The circuit is preferably configured to generate a corresponding current flow in the coils 44 in dependence of an actual position of the rotor device 12 and a desired position, in order to generate the desired movement of the rotor device 12 with respect to the stator device 14. On the circuit board 42 all elements necessary for the desired control/regulation of the rotor device, such as processor, storage module and the like, are arranged.

The coils 44, from which at least three are present, are wrapped around corresponding return elements 46, wherein these return elements 46 are directed towards the permanent magnets 18, i.e. they point downwards with respect to the arrangement of the rotor device 12 on the stator device 14. The return elements 46 extend through the coils 44 and are connected with each other over bar-like connections 48 which are arranged above the coils 44. The bar-like connections 48 and the return elements 46 may be formed integrally, for example as a so-called return metal plate.

In the bottom 34 of the main body 28 openings 50 are provided. These openings 50, from which only one can be seen in FIG. 2, are configured such that they are arranged above the measurement tracks 40 in the assembled state of the linear motor. Through the openings 50 the respective sensors 52-1, 52-2 which are connected to the board 42, may scan the measurement tracks, in order to generate the corresponding measurement signals, which may be evaluated by the circuit, in order to determine position and/or speed and/or acceleration values of the rotor device. For each measurement track 40 two sensors 52-1 and 52-2 are provided, respectively, which are arranged along the movement direction FR in a predetermined distance SA.

Figure 4:
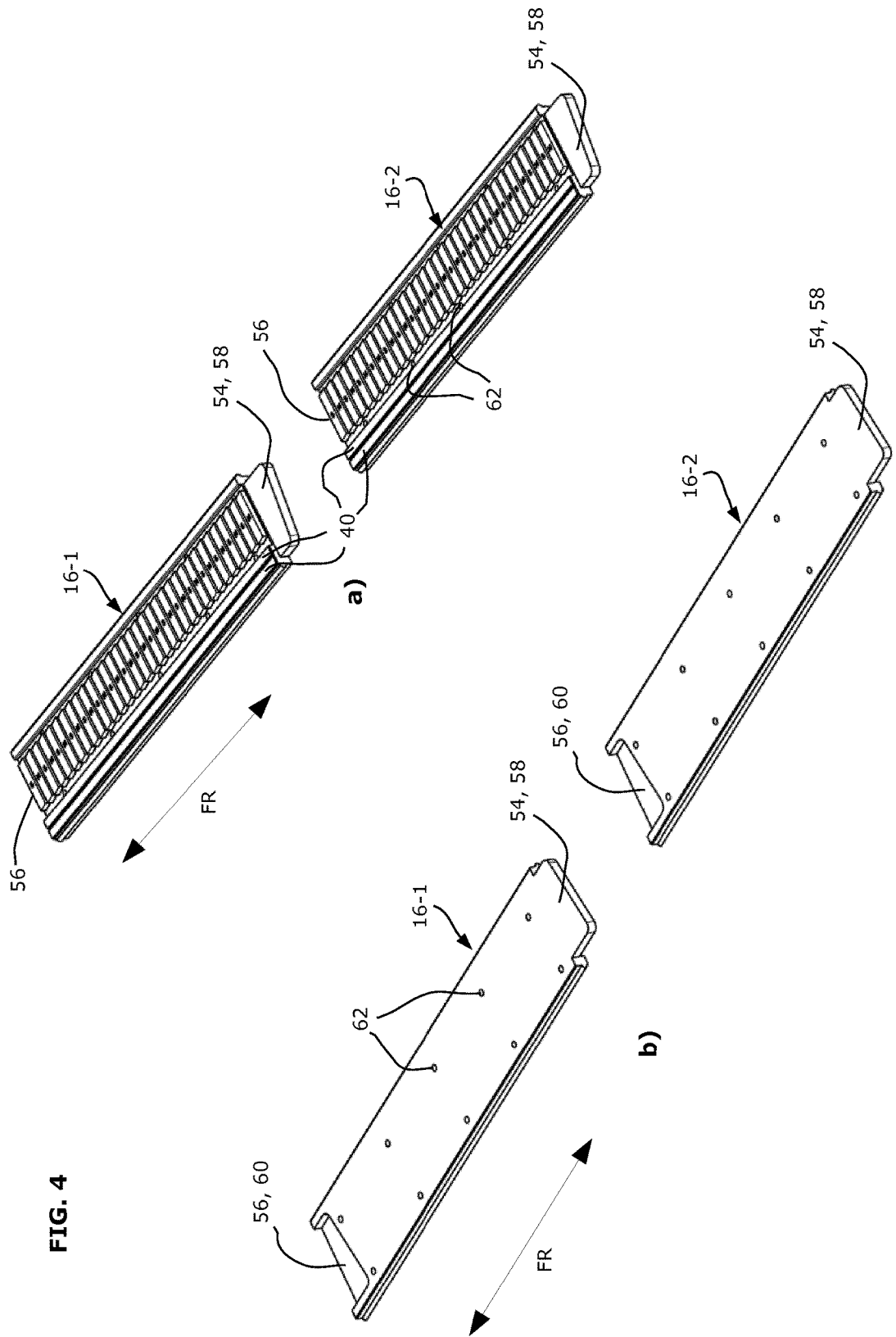
FIG. 4 shows in sub-figures a) and b) two stator modules in simplified perspective view, respectively, wherein sub-figure a) shows a top view and sub-figure b) a bottom view.

The distance SA of the respective sensor pairs 52-1 and 52-2 is chosen such that the sensors 52-1 and 52-2 capture with sufficient reliability measurement tracks of stator modules 16-1 and 16-2 adjacent to and connected with each other along the movement direction FR, as it is illustrated in FIGS. 4*a*) and 4*b*), when the rotor device is located at a transition between two stator modules 16-1 and 16-2. The stator device 14 is preferably formed from several stator modules 16-1 and 16-2, wherein the stator modules 16-1 and 16-2 each comprise a first module ending 54 and a second module ending 56. The module endings 54 and 56 are configured such that between one end (here the first end 54) of a first stator module 16-1 and a complementary end (here the second end 56) of a second stator module 16-2 a form-closed connection can be established. As can be seen from FIGS. 4*a*) and 4*b*) each first module ending 54 comprises to this end a connection section 58 protruding along the movement direction FR, which may be inserted into corresponding connection recesses 60 at the respective second endings 56. The connection sections 58 and the connection recesses 60 are arranged below the permanent magnets 18 with respect to an assembled state of the linear motor such that towards the upper surface a continuous alternation of permanent magnets 18 results. The connection sections 58 and the complementary connection recesses 60 are for example trapezoidal. Preferably, the connection sections 58 and connection recesses 60 are configured such that a kind of forced alignment or centering of stator modules 16-1 and 16-2 connected to each other becomes possible. Further, on the stator modules 16-1 and 16-2 drill holes 62 are provided, which are provided to be able to connect the stator modules with an element of an corresponding device (machine), in which the linear motor is to be used, preferably by a screw coupling or the like. The form-closed connection between two neighboring stator modules 16-1 and 16-2 allows for a distance between the two stator modules 16-1 and 16-2 which is as small as possible in the assembled state such that between the stator modules 16-1 and 16-2 only a small spacing due to their meeting occurs, as is for example usual for track connections.

Figure 5:
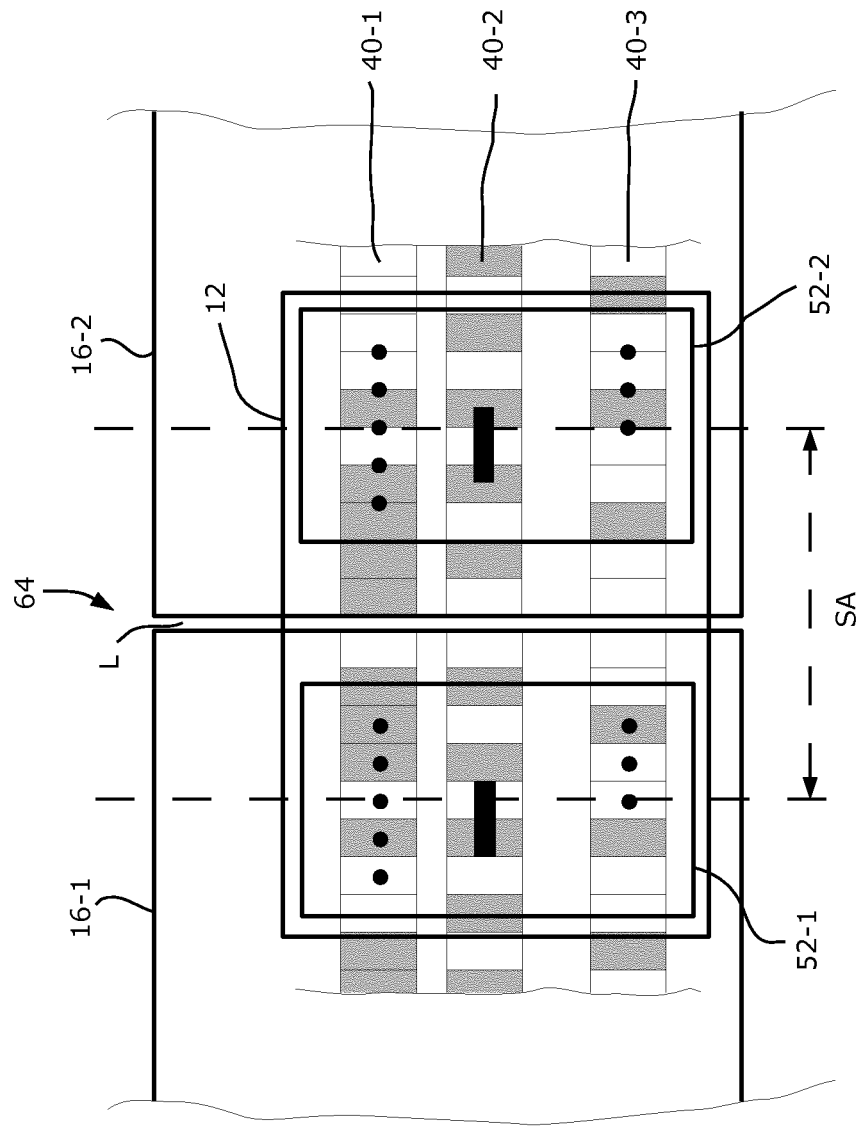
FIG. 5 shows simplified and schematically a possible embodiment of measurement tracks in the transition area between two stator modules and also schematically the arrangement of a sensor unit provided in the rotor device together with the possible scanning areas.

FIG. 5 shows in strongly simplified and schematic manner the transition area 64 between two stator modules 16-1 and 16-2 connected to each other. Only exemplarily the stator modules 16-1 and 16-2 each comprise three measurement tracks 40-1, 40-2 and 40-3. Between the adjacent stator modules 16-1 and 16-2 a spacing L exists due to construction or/and production conditions, which ranges usually in the order of several millimeters or/and in the sub-millimeter range. The spacings between two neighboring stator modules do not each have the same size. For a modular setup of a stator device 16 this spacing L has the effect that spacings between the measurement tracks 40-1, 40-2 and 40-3 occur, too, which are essentially of the same size. By arranging several stator modules 16-1 and 16-2 one after another an effective total length of the stator device results therefore, which deviates (is larger) by the magnitude of the summed spacings L from a theoretic total length. In order to consider this error due to the formation of spacings during the position determination, the sensor units 52-1 and 52-2 are arranged in the previously mentioned distance SA (cf. FIG. 2 and FIG. 3) from each other such that during traversing of a transition area 64 (of a spacing L) between two stator modules 16-1 and 16-2 the situation occurs that one sensor unit 52-1 scans still the measurement tracks on the first stator module 16-1, while the other sensor unit 52-2 scans already the measurement tracks on the neighboring second stator module 16-2. By means of the sensor unit 52-2 the displacement of the measurement tracks by the amount of the spacing L can be determined based on a comparison of the scanned patterns, which represent these displacement, with a continuous (spacing-free) pattern, which may serve as a set point value. The deviation from a set pattern determined by the second sensor unit 52-2 may be used to perform the positioning determination along the stator module 16-2 under consideration of the error L due to the spacing. In this process, the determination of the position using more than one measurement track allows an advantageous redundancy for the determination and compensation of captured or computed errors/positions. In the present example of FIG. 5 three measurement tracks are illustrated for exemplary purposes only. Determining the size of a spacing L and its computational consideration during position determination may also be performed with only one measurement track. That the linear motor may also work with two measurement tracks may be understood from FIGS. 1 to 4. The measurement tracks 40-1, 40-2 and 40-3 as illustrated in FIG. 5 may for example be formed as: an absolute track 40-1 for determining an absolute position along a stator module, an incremental track 40-2 for capturing and counting increments along a stator module and a module track 40-3, which identifies the stator module uniquely and which is differently formed for each stator module. The design of the measurement tracks is illustrated only exemplarily as a sequence of grey and white areas of the same size. These patterns may, however, vary by changing of the various color regions in size, in particular in extension along the movement direction FR. The measurement tracks 40, 40-1, 40-2, 40-3 and the corresponding scanning system (sensors or sensor units 52-1 and 52-2, circuit board 42) of the rotor device 12 are therefore formed in combination such that across the spacings L an error-free measurement and position determination is possible. The modular setup of the stator device 16 consisting of several stator modules 16-1 and 16-2 allows a high flexibility, wherein due to the consecutive arrangement of several stator modules occurring systematic length errors based on spacings L can be taken into account and compensated by the scanning system with the sensors 52-1 and 52-2, which are separated from each other along the movement direction at a distance.

The linear motor with modular setup of stator modules as well as a scanning system for the measurement tracks adapted to the modular setup presented here may be used in various superordinate devices, in which a linear movement has to be performed precisely. The modular setup allows the adaption of the linear motor to larger and smaller devices. Further, stator modules may also be reused or combined with further stator modules, if the linear motor has to be enlarged. Altogether, a flexibly usable linear motor for various applications is provided. Preferably, the presented linear motor is used in a pipetting apparatus, in order to move a pipetting device with several pipette tips, which have to be moved precisely to stationary sampling containers.

The invention claimed is:
1. A linear motor comprising:
   at least one stator device (14) with a plurality of permanent magnets (18, 18-1, 18-2) of different polarity and with at least one carrier rail (24), and
   at least one rotor device (12) with at least three electrical coils (44) and at least one supporting profile (26), wherein the supporting profile (26) is supported on the carrier rail (24) of the stator device (14),
   wherein the rotor device (12) and the stator device (14) are moveable to and fro with respect to each other along a movement direction (FR) defined by the carrier rail

(24) by interaction between magnetic fields of the permanent magnets (18, 18-1, 18-2) and magnetic fields of the coils (44), wherein the stator device (14) is formed from a plurality of stator modules (16-1, 16-2) connected with each other along the movement direction (FR) such that a transition area (64, L) is formed between each two adjacent stator modules (16-1, 16-2), and each stator module (16-1, 16-2) includes at least one measurement track (40, 40-1, 40-2, 40-3) which runs substantially parallel to the movement direction (FR), wherein the rotor device (12) includes at least two sensor units (52-1, 52-2) configured to scan the at least one measurement track (40, 40-1, 40-2, 40-3) of each stator module (16-1, 16-2), and the at least two sensor units comprise a first sensor unit (52-1) and a second sensor unit (52-2) arranged along the movement direction (FR) of the rotor device (12) and separated by a predetermined distance (SA) such that as the rotor device (12) is arranged on the transition area (64, L) between a first stator module (16-1) and a second stator module (16-2), the first sensor unit (52-1) scans the at least one measurement track (40, 40-1, 40-2, 40-3) of the first stator module (16-1) and the second sensor unit (52-2) scans the at least one measurement track (40, 40-1, 40-2, 40-3) of the second stator module (16-2).

2. The linear motor according to claim 1, wherein each stator module (16-1, 16-2) is formed with two longitudinal sides (20), which extend between the two module endings (54, 56), and each stator module (16-1, 16-2) comprises a recess (22) formed in a traverse direction between the longitudinal sides (20), wherein the permanent magnets (18, 18-1, 18-2) are arranged in the recess (22).

3. The linear motor according to claim 2, wherein the at least one measurement track (40, 40-1, 40-2, 40-3) is arranged in a traverse direction between one of the longitudinal sides (20) and the permanent magnets (18, 18-1, 18-2).

4. The linear motor according to claim 2, wherein each permanent magnet (18, 18-1, 18-2) comprises a flat bar having two longitudinal sides (19), wherein the longitudinal sides (19) of the flat bar are inclined with respect to the longitudinal sides (19) of the stator modules (16-1, 16-2).

5. The linear motor according to claim 2, wherein the at least one carrier rail (24) is arranged along one of the longitudinal sides (19) of each stator module (16-1, 16-2), and the at least one carrier rail (24) forms a convex profile protruding from one of the longitudinal sides (19) of each stator module (16-1, 16-2).

6. The linear motor according to claim 1, wherein the rotor device (12) comprises a magnetic return metal sheet (46, 48) having a plurality of return elements (46) facing the plurality of permanent magnets (18, 18-1, 18-2) of the stator device (14), wherein each return element (46) is wrapped by a corresponding electric coil (44).

7. The linear motor according to claim 1, wherein each stator module (16-1, 16-2) comprises a first module ending (54) and a second module ending (56), wherein the first and second module endings (54, 56) are configured such that a first module ending (54) of the first stator module (16-1) is configured to connect with a second module ending (56) of the second stator module (16-2).

8. The linear motor according to claim 7, wherein the first module ending (54) of each stator module (16-1, 16-2) comprises a connection section (58) protruding along a longitudinal direction and the second module ending (56) of each stator module (16-1, 16-2) comprises a connection recess (60) formed in the longitudinal direction, such that the connection section (58) of first module ending (54) is configured to be inserted into the recess (60) of the second module ending (56).

9. The linear motor according to claim 1, wherein each stator module (16-1, 16-2) comprises a plurality of drill holes (62) configured to fix the stator module (16-1, 16-2) on a frame of a superordinate device via bolts or screws.

10. The linear motor according to claim 1, wherein the at least one measurement track (40, 40-1, 40-2, 40-3) comprises a first measurement track (40-1) for scanning an absolute position on the stator module, a second measurement track (40-2) for scanning of predetermined increments along the stator module, and a third measurement track (40-3) for identifying the stator module within the stator device.

11. The linear motor according to claim 10, wherein each sensor unit (52-1, 52-2) comprises a plurality of sensors, and each sensor is assigned to a respective measurement track (40, 40-1, 40-2, 40-3).

12. The linear motor according to claim 1, wherein the rotor device (12) comprises a circuit for controlling current flow in the coils (44), the circuit is configured to generate a corresponding current flow in the coils (44) in dependence of the actual position of the rotor device (12) and a desired position to be reached in order to generate a desired movement of the rotor device (12) with respect to the stator device (14).

13. The linear motor according to claim 12, wherein the circuit is configured to determine at least a position, a speed, or an acceleration of the rotor device (12) with respect to the stator device (14), the circuit comprises an evaluation device, configured to generate position dependent signals based on scanning signals, which are captured from the sensor units (52-1, 52-2).

14. The linear motor according to claim 1, wherein the rotor device (12) is connected with a current source.

15. The linear motor according to claim 1, wherein the stator device (14) further comprises stator termination elements, which are connected with at least one stator module (16-1, 16-2) and the stator termination elements are configured to stop the movement of the rotor device (12).

16. Pipetting apparatus, comprising at least one linear motor according to claim 1, wherein the at least one linear motor is provided for moving a pipetting device of the pipetting apparatus.

17. A stator device of a linear motor (10) comprising a plurality of permanent magnets (18, 18-1, 18-2) of different polarity and at least one carrier rail (24) for supporting a rotor device (12) of the linear motor (10), wherein the rotor device (12) and the stator device (14) are moveably to and from with respect to each other along a movement direction (FR) defined by the carrier rail (24), wherein the stator device (14) is formed from at least one stator module (16-1, 16-2) with a first module ending (54) and a second module ending (56), wherein the first and second module endings (54, 56) are configured such that a first module ending (54) of a first stator module (16-1) is configured to detachably connect with a second module ending (54) of a second stator module (16-2) so that a distance (L) between the first stator module (16-1) and the second stator module (16-2) is less than 1 millimeter.

18. The stator device according to claim 17, wherein the at least one stator module (16-1, 16-2) is formed with two longitudinal sides (20), which extend between the first module ending (54) and the second module ending (56), wherein the at least one stator module (16-1, 16-2) comprises a recess (22) formed in a traverse direction between the longitudinal sides (20), wherein the permanent magnets (18, 18-1, 18-2) are arranged in the recess (22).

19. A rotor device of a linear motor (10) comprising:
at least three electrical coils (44) and at least one supporting profile (26), and the supporting profile (26) is supportable on a carrier rail (24) of a stator device (14) of the linear motor (10),
a magnetic return metal sheet (46, 48) having a plurality of return elements (46), and each return element (46) is wrapped by a corresponding coil (44);
wherein the rotor device (12) and the stator device (14) are moveably to and fro relative to each other along a movement direction (FR) by interaction between magnetic fields of permanent magnets (18, 18-1, 18-2) of a stator device (14) and magnetic field of the coils (44),
wherein the rotor device (12) is configured to be linked with the stator device (14) such that the plurality of return elements (46) face the plurality of permanent magnets (18, 18-1, 18-2) of the stator device (14).

20. The stator device according to claim 17, wherein the first module ending (54) of the stator module comprises a connection section (58) protruding along a longitudinal direction and that the second module ending (56) comprises a connection recess (60) formed in the longitudinal direction, such that the connection section (58) of first module ending (54) is configured to be inserted into the recess (60) of the second module ending (56) in a connected state of two adjacent stator modules (16-1, 16-2).

21. The stator device according to claim 17, wherein in the stator module (16-1, 16-2) comprises a plurality of drill holes (62) configured to fix the stator module (16-1, 16-2) on a frame of a device via bolts or screws.

22. The stator device according to claim 17, wherein the least one stator module (16-1, 16-2) comprises a plurality of measurement tracks (40, 40-1, 40-2, 40-3), wherein the plurality of measurement tracks (40, 40-1, 40-2, 40-3) include a first measurement track (40-1) for scanning an absolute position on the stator module, a second measurement track (40-2) for scanning of predetermined increments along the stator module, and a third measurement track (40-3) for identifying the stator module within the stator device.

23. The stator device according to claim 17, wherein the stator device (14) further comprises stator termination elements which are connected with the at least one stator module (16-1, 16-2) and the stator termination elements are configured to stop the movement of the rotor device (12) of the linear motor (10).

24. The rotor device according to claim 19, comprising a circuit for controlling current flow in the coils (44), wherein the circuit is configured to generate a corresponding current flow in the coils (44) in dependence of the actual position of the rotor device (12) and a desired position to be reached in order to generate the desired movement of the rotor device (12) with respect to the stator device (14).

* * * * *